US011215068B2

(12) United States Patent
Model et al.

(10) Patent No.: US 11,215,068 B2
(45) Date of Patent: Jan. 4, 2022

(54) ADJUSTABLE GUIDE APPARATUS FOR A TURBINE, TURBINE FOR AN EXHAUST TURBOCHARGER AND EXHAUST TURBOCHARGER

(71) Applicant: IHI CHARGING SYSTEMS INTERNATIONAL GMBH, Amt Wachsenburg ot Ichtershausen (DE)

(72) Inventors: Max Model, Darmstadt (DE);
Marc-Pierre Weiss, Mannheim (DE);
Vladimir Petrov, Eppelheim (DE)

(73) Assignee: IHI CHARGING SYSTEMS INTERNATIONAL GMBH, Amt Wachsenburg ot Ichterhausen (DE)

( * ) Notice: Subject to any disclaimer, the term of this patent is extended or adjusted under 35 U.S.C. 154(b) by 31 days.

(21) Appl. No.: 16/779,720

(22) Filed: Feb. 3, 2020

(65) Prior Publication Data
US 2020/0173303 A1 Jun. 4, 2020

Related U.S. Application Data

(63) Continuation-in-part of application No. PCT/EP2018/000388, filed on Aug. 3, 2018.

(30) Foreign Application Priority Data

Aug. 17, 2017 (DE) ...................... 10 2017 118 794.4

(51) Int. Cl.
*F01D 17/16* (2006.01)
*F02B 37/24* (2006.01)
(Continued)

(52) U.S. Cl.
CPC ............ *F01D 17/165* (2013.01); *F02B 37/24* (2013.01); *F01D 25/24* (2013.01); *F02C 6/12* (2013.01);
(Continued)

(58) Field of Classification Search
CPC ........ F01D 17/165; F01D 25/24; F02B 37/24; F02C 6/12; F05D 2220/40; F05D 2230/90; F05D 2240/12; F05D 2260/30
See application file for complete search history.

(56) References Cited

U.S. PATENT DOCUMENTS 6,916,153 B2 *   7/2005   Boening .............. F01D 17/165
                                                          415/163
8,257,027 B2 *   9/2012   Hoecker .................. F01D 9/04
                                                          415/126
(Continued)

FOREIGN PATENT DOCUMENTS

DE           102 09 172 A1      9/2003
DE     10 2010 019 542 A1     11/2011
(Continued)

OTHER PUBLICATIONS

The International Search Report for the corresponding international application No. PCT/EP2018/000388, dated Nov. 16, 2018, in the German language (3 pages).
(Continued)

*Primary Examiner* — Jesse S Bogue
(74) *Attorney, Agent, or Firm* — Ronald S. Lombard

(57) ABSTRACT

An adjustable guide apparatus for a turbine, comprising a bearing ring with a plurality of guide vanes, wherein the guide vanes are rotatably mounted on the bearing ring with the aid of guide vane shafts, wherein in order to position the guide vane, the guide vane shaft is allocated an adjusting lever which engages in a rotatable rotating ring of the adjustable guide apparatus, and wherein, in order to be held in an exhaust gas guiding section of the turbine, the adjustable guide apparatus has a support ring, and wherein the support ring serves to mount the rotating ring. The rotating ring is radially and/or axially guided with the aid of at least one guiding element, wherein the guiding element is
(Continued)

received on the support ring. Furthermore, the invention relates to a turbine with an adjustable guide apparatus and to an exhaust turbocharger.

13 Claims, 3 Drawing Sheets

(51) Int. Cl.
*F01D 25/24* (2006.01)
*F02C 6/12* (2006.01)

(52) U.S. Cl.
CPC ...... *F05D 2220/40* (2013.01); *F05D 2230/90* (2013.01); *F05D 2240/12* (2013.01); *F05D 2260/30* (2013.01)

(56) References Cited

U.S. PATENT DOCUMENTS

| | | | | |
|---|---|---|---|---|
| 8,668,443 | B2* | 3/2014 | Espasa | F01D 17/165 |
| | | | | 415/160 |
| 8,967,956 | B2* | 3/2015 | Arnold | F02C 6/12 |
| | | | | 415/158 |
| 9,017,017 | B2* | 4/2015 | Sausse | F01D 17/165 |
| | | | | 415/160 |
| 9,429,033 | B2* | 8/2016 | Martin | F01D 17/16 |
| 9,664,060 | B2* | 5/2017 | Inoue | F01D 17/16 |
| 9,945,245 | B2* | 4/2018 | Inoue | F01D 17/165 |
| 10,858,952 | B2* | 12/2020 | Asakawa | F01D 17/16 |
| 2009/0092483 | A1 | 4/2009 | Yasui et al. | |
| 2010/0260597 | A1* | 10/2010 | Sausse | F01D 17/165 |
| | | | | 415/160 |
| 2011/0014033 | A1* | 1/2011 | Boning | F02B 37/24 |
| | | | | 415/148 |
| 2014/0248137 | A1 | 9/2014 | Inoue et al. | |
| 2015/0056067 | A1 | 2/2015 | Segawa | |
| 2015/0132113 | A1* | 5/2015 | Jaenike | F01D 17/165 |
| | | | | 415/160 |
| 2017/0130646 | A1 | 5/2017 | Yoshizaki et al. | |
| 2018/0156061 | A1 | 6/2018 | Asakawa et al. | |
| 2018/0238190 | A1* | 8/2018 | Ikeda | F01D 17/165 |
| 2018/0328271 | A1* | 11/2018 | Asakawa | F01D 17/165 |

FOREIGN PATENT DOCUMENTS

| | | |
|---|---|---|
| DE | 10 2010 042 181 A1 | 4/2012 |
| DE | 10 2015 215 356 A1 | 2/2017 |
| JP | 2009-243 431 A | 10/2009 |

OTHER PUBLICATIONS

The English translation of the International Search Report for the corresponding international application No. PCT/EP2018/000388 (3 pages)

* cited by examiner

ADJUSTABLE GUIDE APPARATUS FOR A TURBINE, TURBINE FOR AN EXHAUST TURBOCHARGER AND EXHAUST TURBOCHARGER

CROSS-REFERENCE TO RELATED APPLICATIONS

This is a continuation-in-part application of pending international application PCT/EP2018/000388 filed Aug. 3, 2018 and claiming the priority of German application No. 10 2017 118 794.4 filed Aug. 17, 2017. The said International application PCT/EP2018/000388 and German application No. 10 2017 118 794.4 are both incorporated herein by reference in their entireties as though fully set forth.

BACKGROUND OF THE INVENTION

The invention relates to an adjustable guide apparatus for a turbine, a turbine for an exhaust turbocharger and an exhaust turbocharger according to the claims.

Laid open document DE 10 2014 203 498 A1 discloses an adjustable guide apparatus for a turbine. The adjustable guide apparatus can be used to condition a flow of exhaust gases exiting an internal combustion engine against a turbine wheel received in an exhaust guiding section of the turbine. For this purpose, the guide apparatus comprises a number of adjustable guide vanes which can be positioned in a nozzle channel in the exhaust guiding section, upstream of a wheel chamber in the exhaust guiding section in which the turbine wheel is rotatably received. The guide apparatus has a bearing ring with a plurality of guide vanes, wherein the guide vanes are rotatably mounted on the bearing ring with the aid of guide vane shafts. The guide vane shafts are in principle allocated adjusting levers which are designed to be able to engage in a rotating ring. The rotating ring has apertures to receive the adjusting levers.

The rotating ring is in the form of an annular disc and is mounted so as to be supported radially and axially. The axial and radial support is provided with the aid of the bearing ring. In order to reduce friction, the rotating ring has apertures on its bearing surface disposed opposite the bearing ring. Surface contact between the rotating ring and the bearing ring, and consequently the friction loss owing to surface rubbing, is thereby reduced.

It is the object of the invention to provide an adjustable guide apparatus which is characterized by a further reduction in friction losses, which is to be achieved with the aid of simple measures. Furthermore, it is the object of the invention to provide a turbine which has increased operational reliability, and an exhaust turbocharger with a significantly improved degree of efficiency.

SUMMARY OF THE INVENTION

These objects are achieved with the aid of an adjustable guide apparatus for a turbine, a turbine and an exhaust turbocharger having the features of the claims. Advantageous embodiments with expedient and non-trivial developments of the invention are specified in the dependent claims.

An adjustable guide apparatus of this type for a turbine includes a bearing ring with a plurality of guide vanes, wherein the guide vanes are rotatably mounted on the bearing ring with the aid of guide vane shafts. In order to position the guide vane, the guide vane shaft is allocated an adjusting lever which is designed to be able to engage in a rotatable rotating ring of the adjustable guide apparatus. In order to be held in an exhaust gas guiding section of the turbine, the adjustable guide apparatus has a support ring which serves to mount the rotating ring. In accordance with the invention, the rotating ring is radially and/or axially guided with the aid of at least one guiding element, wherein the guiding element is received on the support ring. The advantage is in a simple constructional form for the bearing ring which is no longer required for direct mounting of the rotating ring. The rotating ring is mounted on the support ring which can be simply produced, usually with the aid of a deformation process, and is usually produced from a metal ring with a small material thickness.

By the simple constructional form of the bearing ring it is possible for it to be produced with a reduced amount of material and in less time since it is no longer complex. All in all this leads to an inexpensive adjustable guide apparatus.

Reliable guidance of the rotating ring can be achieved in that a contact is formed between the support ring and the rotating ring. Furthermore, with the aid of the contact on the support ring, at least one-sided axial mounting is effected in such a way that the guiding element for reliable axial guidance merely has to be formed for one-sided axial mounting, and specifically for the opposing axial mounting already present.

In one embodiment of the adjustable guide apparatus in accordance with the invention, at least one support element for receiving the guiding element is disposed on the support ring. Therefore, the support ring can be produced while maintaining a low material requirement and consequently a low weight. In a further embodiment of the adjustable guide apparatus in accordance with the invention, the support element has a spacing element which is disposed on the support ring. The spacing element provides the possibility of effecting axial spacing of the support element from the support ring in a simple manner. The support element should have the least possible contact with the rotating ring in order to bring about reduced friction. This is to be achieved by disposing the support element and the support ring in two different axial planes, wherein the spacing is achieved with the aid of the spacing element formed between the support ring and the support element.

In a further embodiment, the guiding element is connected to the support ring in an integrally bonded and/or frictionally connected and/or form-fitting manner for reliable reception. In order to achieve a guide apparatus which is produced in a more inexpensive manner a press-fit is formed between the guiding element and the support ring.

In a further embodiment, the guiding element comprises at least one step. The guiding element, which is preferably rotationally symmetrically in the form of a pin or bolt, has, on its outer periphery, at least one step which can serve for axial mounting of the rotating ring so that the smallest possible contact surface exists between the guiding element and the rotating ring. The axial mounting is one-sided since the step can be provided for a stop, which is one-sided in the axial direction, of the rotating ring on the guiding element.

In a further embodiment, the support ring is inexpensively produced with the aid of a deformation process. A further aspect of the invention relates to a turbine for an exhaust turbocharger, having an exhaust gas guiding section, which can have a flow passing through it, and a turbine wheel rotatably received in a wheel chamber of the exhaust gas guiding section. Upstream of the turbine wheel, an adjustable guide apparatus is disposed in the exhaust gas guiding section. The adjustable guide apparatus is designed according to any one of the claims. The advantage of this turbine is an increase in the degree of efficiency owing to reduced friction in the adjustable guide apparatus.

In particular, an exhaust turbocharger in accordance with the invention having a turbine in accordance with the invention is characterized by a particularly high degree of efficiency owing to the reduction in friction losses. In turn this leads to a reduction in exhaust gas emissions, in particular in connection with an internal combustion engine provided in vehicles, since an increase in the degree of efficiency of the exhaust turbocharger leads to optimized coordination between the exhaust turbocharger and the internal combustion engine.

BRIEF DESCRIPTION OF THE DRAWINGS

Further advantages, features and details of the invention will be apparent from the following description of preferred exemplified embodiments and with reference to the drawings. The features and combinations of features mentioned earlier in the description and the features and combinations of features mentioned hereinafter the description of the figures and/or illustrated individually in the figures can be employed not only in the combination stated in each case but also in other combinations or on their own without departing from the scope of the invention. Like or functionally identical elements are allocated identical reference signs. For reasons of clarity it is possible for the elements not to be provided with their reference sign in all figures but this does not mean that they are no longer allocated same. In the figures.

DETAILED DESCRIPTION OF THE INVENTION

An exhaust gas guiding section, which can have a flow passing through it and is not illustrated in more detail, of an exhaust turbocharger is provided in an exhaust gas tract, not illustrated in more detail, of an internal combustion engine, not illustrated in more detail, which is an Otto engine or a diesel engine. The exhaust turbocharger further has a fresh air guiding section, which can have a flow passing through it and is not illustrated in more detail, and a bearing section, not illustrated in more detail, which is disposed in an exhaust gas tract, not illustrated in more detail, of the internal combustion engine.

The exhaust turbocharger has a rotor assembly, not illustrated in more detail, which includes a compressor wheel, not illustrated in more detail, for drawing in and compressing combustion air, a turbine wheel, not illustrated in more detail, for expansion of exhaust gas, and a shaft, which is not illustrated in more detail and connects the compressor wheel to the turbine wheel for conjoint rotation therewith, with an axis of rotation. The shaft is rotatably mounted in the bearing section of the exhaust turbocharger which is positioned between the air guiding section and the exhaust gas guiding section, not illustrated in more detail.

An inlet channel, not illustrated in more detail, is formed in the exhaust gas guiding section in order for the exhaust gas to flow into the exhaust gas guiding section. The inlet channel serves to condition the exhaust gas which causes the turbine wheel to rotate during operation of the internal combustion engine. With the aid of the shaft the compressor wheel is likewise caused to rotate and so combustion air is drawn in and compressed. Downstream of the inlet channel, a spiral channel, not illustrated in more detail, is disposed in the exhaust gas guiding section and serves to provide a rotationally symmetrical flow. Furthermore, the spiral channel is designed as a connection channel between the inlet channel and a nozzle channel, not illustrated in more detail, which is positioned downstream of the spiral channel. Downstream of the nozzle channel a wheel chamber, not illustrated in more detail, is provided in the exhaust gas guiding section in which the turbine wheel is rotatably received. Downstream of the wheel chamber, the exhaust gas guiding section has an outlet channel, not illustrated in more detail, for the escape of the exhaust gas from the exhaust gas guiding section.

In order that the greatest possible degree of exhaust turbocharger efficiency can be achieved both at low loads and low rotational speeds of the internal combustion engine and also at high loads and high rotational speeds of the internal combustion engine, the exhaust gas can be conditioned with the aid of an adjustably designed guide apparatus 1 which is disposed in the exhaust gas guiding section.

Figure 1:
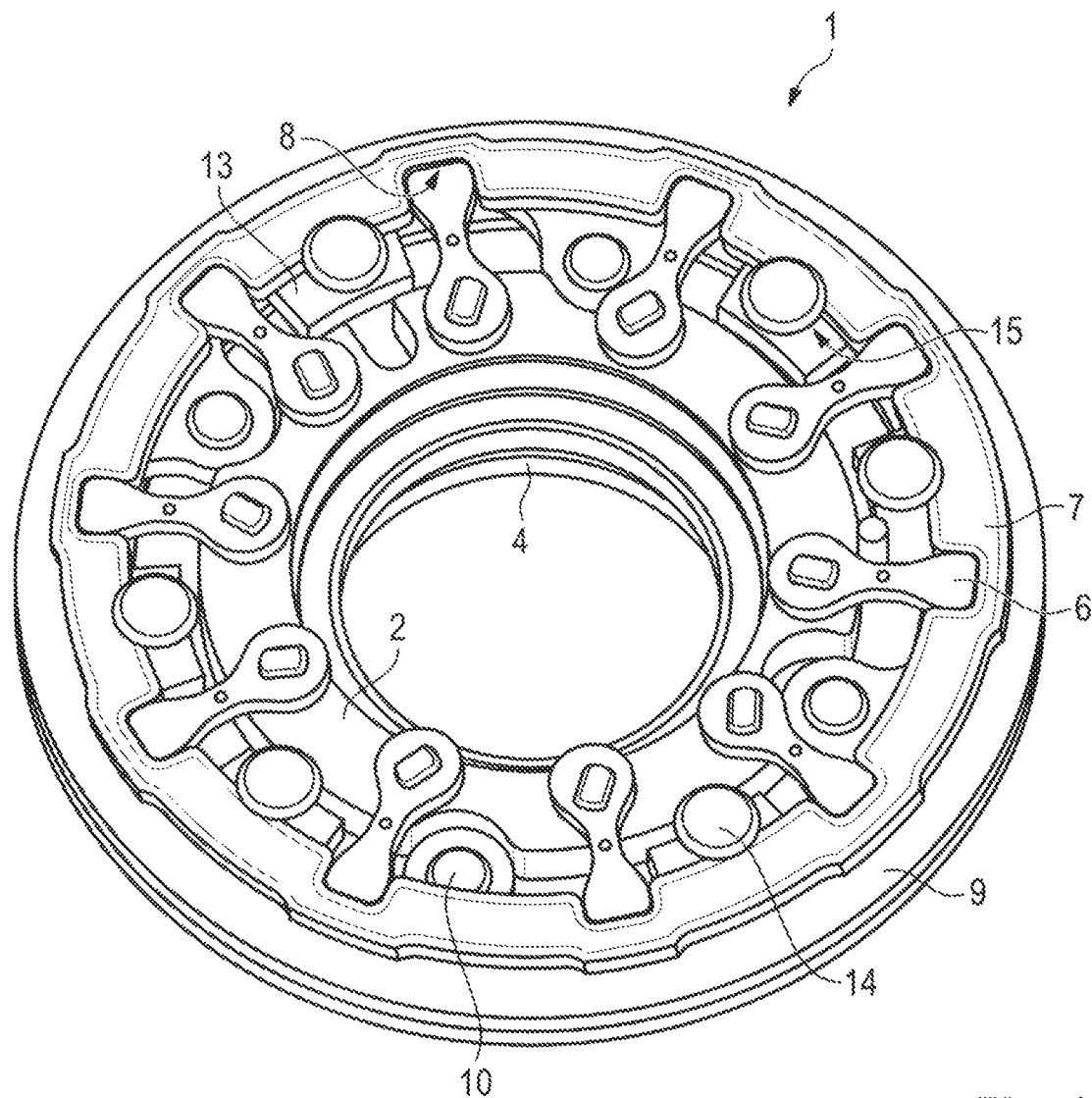
FIG. 1 shows a perspective plan view of an adjustable guide apparatus in accordance with the invention.
Figure 2:
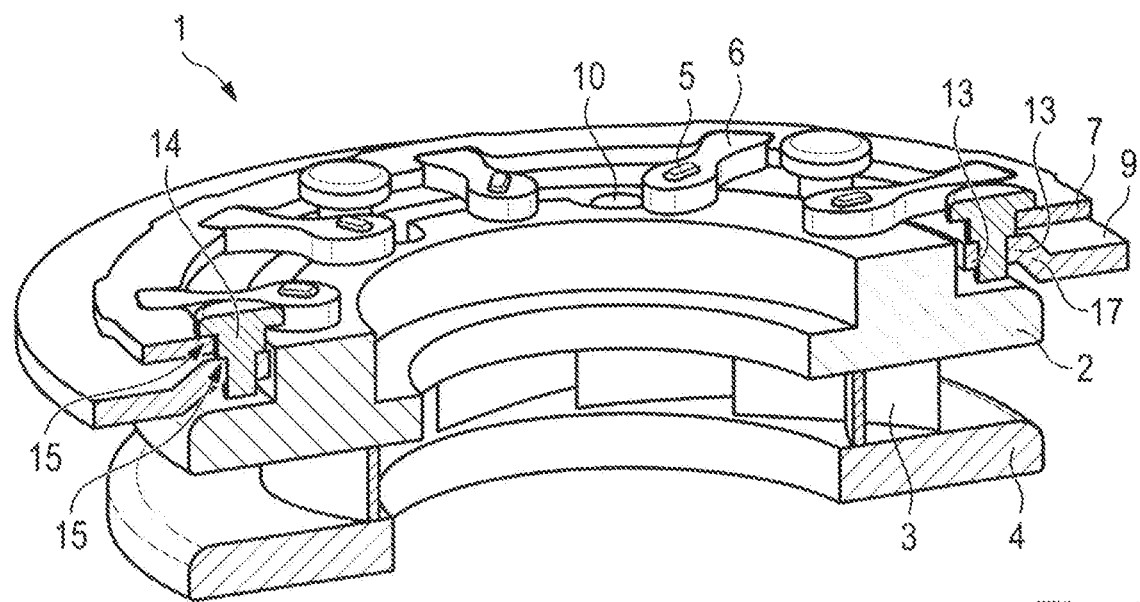
FIG. 2 shows a perspective cross-section of the guide apparatus according to FIG. 1.
Figure 4:
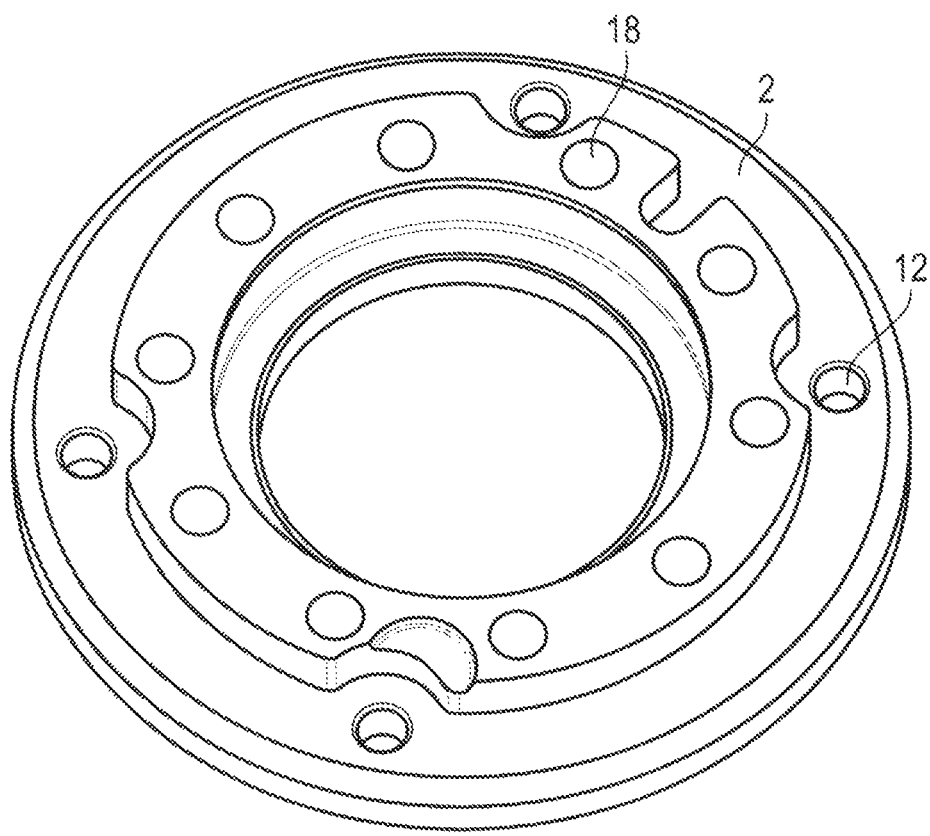
FIG. 4 shows a perspective plan view of a bearing ring of the adjustable guide apparatus according to FIG. 1.

An adjustable guide apparatus 1 in accordance with the invention is formed according to FIG. 1. FIG. 2 illustrates an adjustable guide apparatus 1 in accordance with the invention in a perspective cross-sectional view. The guide apparatus 1 is designed to annularly encompass the turbine wheel and has a bearing ring 2, see in particular FIG. 4, to receive guide vanes 3 which are provided for flow conditioning. The guide vanes 3 are rotatably mounted on the bearing ring 2.

The bearing ring 2 is positioned in the exhaust gas guiding section in such a way that the guide vanes 3 are disposed in the nozzle channel. A contour ring 4, which is designed for simplified mounting of the guide apparatus 1 in the form of a cassette in the exhaust gas guiding section, is positioned opposite the bearing ring 2. Furthermore, the contour ring 4 serves for further mounting of the guide vanes 3.

For rotatable mounting of the guide vanes 3 on the bearing ring 2, one guide vane shaft 5 per guide vane 3 is provided, which shaft is connected to the guide vane 3 for conjoint rotation therewith and—being rotatably mounted on the bearing ring 2—is received in a bearing opening 18. In order to rotate the guide vane shaft 5, and therefore the guide vane 3, the guide vane shaft 5 has, at its end facing away from the guide vane 3, an adjusting lever 6 which is likewise connected to the guide vane shaft 5 for conjoint rotation therewith.

The rotational movement of the guide vanes 3 can be initiated with the aid of a rotating ring 7 which is positioned coaxially with the bearing ring 2 in the adjustable guide apparatus 1. The rotating ring 7 has apertures 8 into which the adjusting levers 6 are designed to be able to engage, wherein, for engagement into the corresponding aperture, an end of the adjusting lever 6 facing away from the guide vane shaft 5 is ideally provided.

For axial and radial securing of the rotating ring 7, the adjustable guide apparatus 1 has a support ring 9 which is provided for mounting of the adjustable guide apparatus 1 in the exhaust gas guiding section. In other words this means that within the scope of the invention the support ring 9 is designed for mounting of the rotating ring 7 so that, in addition to its original purpose of mounting the adjustable guide apparatus 1 in the exhaust gas guiding section, it serves for mounting of the rotating ring 7.

Figure 3:
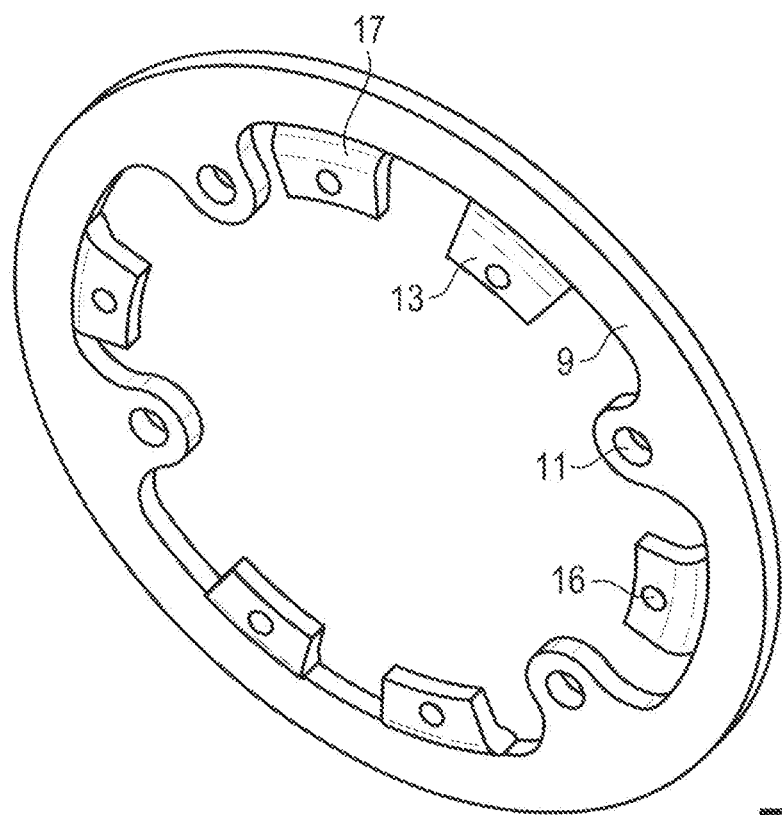
FIG. 3 shows a perspective view of a support ring of the guide apparatus according to FIG. 1.

The support ring 9, which is illustrated in particular in a perspective view in FIG. 3, is immovably fixed on the bearing ring 2 with the aid of four fastening means 10. The fastening means 10 are in the form of screws extending through the support ring 9, these screws being received in fastening openings 11 in the support ring 9. In order to receive the fastening means 10 the bearing ring 2 has receiving openings 12. Similarly, the fastening means 10 could also be e.g. in the form of rivets, wherein any feasible connection to bring about a rigid connection between the bearing ring 2 and the support ring 9 is possible.

The support ring 9 has support elements 13 which are provided to fasten guiding elements 14 in order to guide the rotating ring 7. In the present exemplified embodiment, the guiding elements 14 are in the form of guiding pins which are immovably connected to the support ring 9. The support elements 13 are in the form of support arms which are designed as annular sections. Similarly, the support element 13 could also be in the form of a complete ring, wherein, however, this would increase the friction between the rotating ring 7 and the support ring 9 since the rotating ring 7 is axially mounted on one side with the aid of the support ring 9.

In order to reduce the friction between the rotating ring 7 and the support ring 9 contact is present between the rotating ring 7 and the support ring 9 exclusively in a relatively small radial range B, which is preferably linear. In order that the contact, and therefore the range B, can be minimal, the support element 13 has a spacing element 17, which brings about an axial separation of the support element 13 with respect to the support ring 9, said support element being received on the support ring 9.

In the present exemplified embodiment, the support element 13 is formed as one piece with the support ring 9 and can be produced e.g. inexpensively in a deformation process, e.g. a tensile forming process. Similarly, it could also be connected to the support ring 9 with the aid of an integral bonding process.

The rotating ring 7 is mounted on the side opposite the support element 13 with the aid of the guiding elements 14 in a radially and axially one-sided manner, wherein the guiding elements 14 are immovably received in the support ring 9. In the illustrated exemplified embodiment, the guide pins 14 are designed in the form of a bolt-like element comprising a stepped cross-section. Axial guiding of the support ring 9 can be achieved simply and inexpensively with the aid of the steps 15. The guiding elements 14 are received in the support ring 9 in positioning openings 16.

In a further exemplified embodiment, not illustrated in more detail, the radial and axial mounting of the rotating ring 7 is additionally effected with the aid of guiding rollers immovably received on the support ring 9. In other words this means that guiding rollers, not illustrated in more detail, are also provided for radial and axial securing of the rotating ring 7. The radial mounting and axial mounting arrangements can also each be allocated to a guiding element, i.e. to a pin-like guiding element 14 as illustrated in the present exemplified embodiment, or in the form of the guiding roller. It would also be possible for only one mounting arrangement, axial or radial, to be provided per guiding element.

The guiding roller includes a pin, not illustrated in more detail, and a sleeve, not illustrated in more detail, received on the pin so as to be rotatable about a pin axis. The sleeve can have e.g. a shoulder, with the aid of which at least one-sided axial mounting of the rotating ring 7 in addition to the radial mounting is rendered possible.

The guiding elements 14, and similarly the guiding rollers, can be connected to the support ring 9 with the aid of a joining process e.g. riveting, clamping, screwing or an integrally bonding joining process. They are preferably rotationally symmetrical.

What is claimed is:

1. An adjustable guide apparatus for a turbine in the form of a cassette, comprising a bearing ring (2) with a plurality of guide vanes (3), a contour ring (4) operatively positioned opposite and in coaxial alignment with the bearing ring (2), wherein the guide vanes (3) are rotatably mounted on the bearing ring (2) with the aid of guide vane shafts (5), wherein in order to position each of the guide vanes (3), the respective guide vane shaft (5) is allocated an adjusting lever (6) which is configured to engage in a rotatable rotating ring (7) of the adjustable guide apparatus (1), the rotatable ring (7) in coaxial alignment with the contour ring (4) and the bearing ring (2), and wherein, in order to be held in an exhaust gas guiding section of the turbine, the adjustable guide apparatus (1) includes a support ring (9), the support ring (9) in coaxial alignment with the contour ring (4), the bearing ring (2) and the rotatable ring (7), and wherein the support ring (9) has a larger outer diameter than the contour ring (4), bearing ring (2) and rotatable ring (7) which serves to mount the adjustable guide apparatus (1) including the rotating ring (7), characterized in that
the rotating ring (7) is radially and/or axially guided with the aid of at least one guiding element (14), wherein the guiding element (14) is received on the support ring (9), and wherein the guiding element (14) is pin-shaped.

2. The adjustable guide apparatus as claimed in claim 1, characterized in that a contact is formed between the support ring (9) and the rotating ring (7).

3. The adjustable guide apparatus as claimed in claim 2, characterized in that at least one support element (13) for receiving the guiding element (14) is disposed on the support ring (9).

4. The adjustable guide apparatus as claimed in claim 3, characterized in that the support element (13) has a spacing element (17) which is disposed on the support ring (9) for providing an axial separation of the support element (13) relative to the support ring (9).

5. The adjustable guide apparatus as claimed in claim 1, characterized in that the guiding element (14) is connected to the support ring (9) in an integrally bonded and/or frictionally connected and/or form-fitting manner.

6. The adjustable guide apparatus as claimed in claim 5, characterized in that a press-fit is formed between the guiding element (14) and the support ring (9).

7. The adjustable guide apparatus as claimed in claim 1, characterized in that the guiding element (14) comprises at least one step (15).

8. The adjustable guide apparatus as claimed in claim 1, characterized in that the support ring (9) is produced with the aid of a deformation process.

9. A turbine for an exhaust turbocharger, having an exhaust gas guiding section, which can have a flow passing through it, and a turbine wheel rotatably received in a wheel chamber of the exhaust gas guiding section, and wherein, upstream of the turbine wheel, an adjustable guide apparatus (1) is disposed in the exhaust gas guiding section, characterized in that the adjustable guide apparatus (1) is configured as claimed in claim 1.

10. An exhaust turbocharger having a turbine configured as claimed in claim 9.

11. The adjustable guide apparatus as claimed in claim 3, characterized in that the support element (13) is configured as an annular section comprising a support arm.

12. The adjustable guide apparatus as claimed in claim 3, characterized in that the support element (13) is formed as one piece with the support ring (9).

13. The adjustable guide apparatus as claimed in claim 3, characterized in that the support element (13) is connected to the support ring (9) an integral bonded manner.

\* \* \* \* \*